United States Patent
Bredt

(10) Patent No.: US 9,522,522 B2
(45) Date of Patent: Dec. 20, 2016

(54) THREE DIMENSIONAL PRINTING METHOD AND APPARATUS USING AN INCLINED FLUID JET

(71) Applicant: 3DBotics, Inc., Dearborn, MI (US)

(72) Inventor: James F. Bredt, Watertown, MA (US)

(73) Assignee: 3Dbotics, Inc., Dearborn, MI (US)

(*) Notice: Subject to any disclaimer, the term of this patent is extended or adjusted under 35 U.S.C. 154(b) by 34 days.

(21) Appl. No.: 14/643,489

(22) Filed: Mar. 10, 2015

(65) Prior Publication Data

US 2015/0251354 A1 Sep. 10, 2015

Related U.S. Application Data

(60) Provisional application No. 61/950,542, filed on Mar. 10, 2014.

(51) Int. Cl.
  *B29C 67/00* (2006.01)
  *B33Y 30/00* (2015.01)
  *B29K 105/00* (2006.01)

(52) U.S. Cl.
  CPC ............ *B33Y 30/00* (2014.12); *B29C 67/0059* (2013.01); *B29C 67/0081* (2013.01); *B29K 2105/0058* (2013.01); *B29K 2105/251* (2013.01)

(58) Field of Classification Search
  None
  See application file for complete search history.

(56) References Cited

U.S. PATENT DOCUMENTS

| 5,204,055 A | 4/1993 | Sachs et al. |
| 2013/0026680 A1* | 1/2013 | Ederer ............... B22F 3/105 264/401 |

OTHER PUBLICATIONS http://www.aerotech.comLQroduct-catalogfstag_esLlinear-x-;L-sta_ges.asQx, retrieved Mar. 10, 2014.
ZPrinter310 User Manual as published by Z Corporation, and also published online at http://www.bibus.hu/fileadmin/editors/countries/bihun/product_data/zcorp/documents/zcorp_series_zprinter_310_plus_manual_en.pdf, Nov. 12, 2007.

* cited by examiner

*Primary Examiner* — Mary F Theisen
(74) *Attorney, Agent, or Firm* — Hansen IP Law PLLC

(57) ABSTRACT

Apparatus and methods for fabricating a solid article by three-dimensional printing. A bed of loose solid powder is formed, a fluid dispenser moved parallel to the bed, and a liquid dispensed from the fluid dispenser onto at least a portion of a surface of the powder to form a first printed layer having a first pattern printed thereon. The fluid dispenser includes a printhead inclined at an angle selected from a range of 2 to 20 degrees from vertical with respect to the bed. An apparatus includes a stage, a spreading mechanism to spread layers of loose powder on the stage, and a fluid dispenser disposed above the stage and configured to dispense droplets of fluid that travel in free flight to the stage, the fluid dispenser including a printhead tilted at an angle from 2 to 20 degrees relative to a line perpendicular to the stage surface.

17 Claims, 3 Drawing Sheets

THREE DIMENSIONAL PRINTING METHOD AND APPARATUS USING AN INCLINED FLUID JET

RELATED APPLICATION

This application claims the benefit of priority to U.S. Provisional Application Ser. No. 61/950,542 filed Mar. 10, 2014, which is incorporated herein by reference in its entirety.

FIELD OF THE INVENTION

Embodiments of the invention relate generally to three-dimensional printing ("3D printing") and in particular to methods and equipment for 3D printing.

BACKGROUND

A three dimensional printer, i.e., an apparatus for 3D printing, can be considered as a robot carrying a material dispenser. Various competing 3D printing technologies exist; the 3D printing technology most relevant to the invention disclosed herein is described in U.S. Pat. No. 5,204,055 granted to Sachs, et. al, incorporated herein in its entirety. In this technique, a stream of fluid is directed towards a granular substrate. The combination of fluid and granular material solidifies into a solid article by either solvent action or chemical reaction engendered by the mixing of the two substances.

In the most commonly practiced version of this method, the fluid is dispensed by an ink-jet printhead that travels over the surface of a level bed of loose powder. This method provides a high degree of accuracy in the printed layers, and in the resulting article. Ink-jet printheads are capable of creating images from very uniform, tiny drops of fluid that are accurately placed. A fine grain of powder presents a substrate that can be assembled on a fine scale, and a degree of capillary attraction that holds the fluid in dense, tightly bonded features. One further benefit to using high-resolution ink-jets is the number of printing elements that can be grouped into an array is very large. This permits the machines using them to build solid objects at a speed much higher than other methods that use a single tool for forming material, such as an extrusion head or a laser beam.

Modern microfabrication techniques are facile at creating the intricate, tiny structures needed in ink-jet printheads. Durable materials can be used, and certain types of ink-jet printheads last for years if kept clean. Keeping the ink-jet printhead clean may be a challenge in an environment including the powder typically used for 3D printing.

SUMMARY

In an aspect, embodiments of the invention include a method for fabricating a solid article by three-dimensional printing. The method includes forming a bed of loose solid powder, moving a fluid dispenser parallel to the bed; and dispensing a liquid from the fluid dispenser onto at least a portion of a surface of the powder to form a first printed layer having a first pattern printed thereon. The fluid dispenser includes a printhead inclined at an angle selected from a range of 2 to 20 degrees from vertical with respect to the bed.

One or more of the following features may be included. The angle may be selected from a range of 5 to 15 degrees from vertical with respect to the bed. The fluid dispenser moves in a first direction over the bed while the liquid is dispensed, and the liquid dispensed by the fluid dispenser may travel at the angle of inclination in a second direction, away from the first direction. The bed of loose solid powder may be level.

A second layer of loose solid powder may be spread over the first printed layer. The liquid from the fluid dispenser may be dispensed onto the second layer to define a second pattern different from the first pattern printed on the first printed layer. The liquid and powder may be allowed to intermix to form the solid article.

In another aspect, embodiments of the invention include an apparatus for forming solid articles by 3D printing, the apparatus including a stage, a spreading mechanism configured to spread layers of loose powder on the stage, and a fluid dispenser disposed above the stage and configured to dispense droplets of fluid that travel in free flight to the stage. The fluid dispenser includes a printhead tilted at an angle selected from a range of 2 to 20 degrees relative to a line perpendicular to a surface of the stage.

One or more of the following features may be included. The angle may be selected from a range of 5 to 15 degrees relative to a line perpendicular to a surface of the stage. The spreading mechanism may be, e.g., a blade, a stationary cylindrical rod, a rotating cylindrical rod, or a straight bar comprising a variably curved surface. The spreading mechanism may be disposed above the stage and in a plane parallel thereto.

The fluid dispenser may include a traveling carriage configured to move the fluid dispenser laterally over the stage at a fixed height, in a direction such that the angle of tilt projects the droplets towards regions of the stage that were most recently visited. The carriage may be oriented rectilinearly with respect to the printhead and oriented obliquely with respect to the stage. The carriage may be oriented obliquely with respect to the printhead and oriented rectilinearly with respect to the stage. The carriage may be oriented obliquely with respect to the printhead and the stage. The printhead may be affixed to the carriage by at least one of a clamping mechanism, a fastener, or a combination thereof.

The apparatus may include a robot, with the carriage comprises an electrical and mechanical interface between the robot and the printhead.

DETAILED DESCRIPTION

A drawback to 3D printing by ink-jet printing over a fine powdered substrate is the presence of dust ejected by the substrate in the direction of the printhead. To maintain good printing accuracy, the printhead preferably travels relatively close to the powder, usually only a few millimeters above the printing surface. The droplets emerging from the printhead typically travel at several meters per second, and this ensures a significant amount of momentum transferred to grains of powder occupying the upper surface of the powder bed. Powder is very easily ejected from the bed, and it tends to fly in a direction imposed by the symmetry of the operation—if the jet projects vertically into the powder, the ejected grains tend to scatter upwards.

Since the combination of fluid from the printhead with powder from the substrate is engineered to produce a durable 3D printed solid article, the spurious combination of ejected powder with ink residue on the printhead also tends to create a durable deposit, or coating, on the surface of the printhead near the orifices where the ink emerges. Presently, a great deal of engineering design effort is expended to create devices for cleaning foreign material from the printhead in these machines.

Furthermore, this tendency for deposit creation constrains the choice of materials used for fabrication to those that are possible to detach from the printhead.

Figure 1:
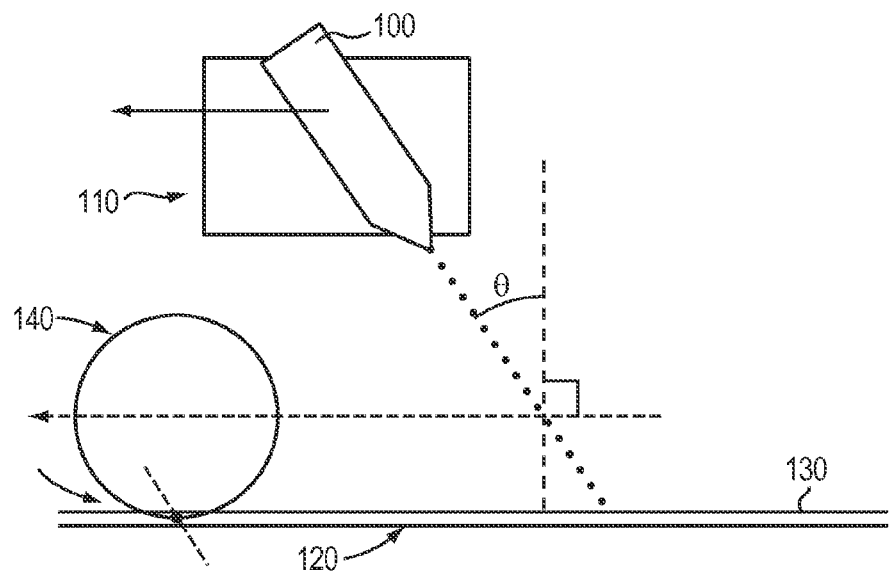
FIG. 1 is a schematic diagram illustrating an inclined printhead dispensing a liquid onto a level bed of powder, in accordance with an embodiment of the invention.

Referring to FIG. 1, in an embodiment of the invention, a fluid dispenser may include an ink-jet printhead 100, e.g., a Q-class printhead manufactured by Fujifilm/Dimatix, such as one or several QS30 printheads with associated electronics and fluid connections. During use while printing, the ink-jet printhead may be tilted at a slight angle θ, e.g., 2-20 degrees from the vertical, more preferably 5-15 degrees from the vertical, when powder disposed below the printhead defines a flat surface.

When the printhead 100 is used on a 3D printer, it is typically mounted on a moveable carriage 110, that traverses over the printing area in a pattern that allows the jets of the printhead to cover an area equal to or greater than the area occupied by a cross-section of the part being built on the 3D printer. See, for example, the ZPrinter310 User Manual as published by Z Corporation, and also published online at http://www.bibus.hu/fileadmin/editors/countries/bihun/product data/zcorp/documents/zcorp series zprinter 310 plus manual en.pdf, Sect. 8.2, pp. 61-63, incorporated herein in its entirety. An exemplary carriage, suitable for use with embodiments of the invention is a carriage assembly for the Z Corporation SpectrumZ510 3D printer, available as part number 22-06872 from 3D Systems. A carriage is a mechanical holder, or brace, that allows one to attach the printing elements to a robot. The carriage may be designed to be attached to a portion of the robot whose position is controlled by the robot's programming, with the printing elements being rigidly attached to the carriage. The carriage with printing elements may generally be considered to be the extreme end of the robot arm, i.e., an end that has the greatest number of degrees of freedom of motion with respect to the floor. Because the printing elements are subject to wear, they may need to be replaced occasionally.

As used herein, a fluid dispenser includes the carriage, printheads, driver boards, and/or fluid components whose locations are fixed relative to the printheads.

In a preferred embodiment, the carriage 110 is manipulated by an industrial robot (not shown) that also performs further actions needed in the process, such as dispensing and leveling powder, and moving the printhead in and out of a cleaning station. The printhead is typically attached to the carriage by fixation means, such as a clamping mechanism or fasteners such as screws, pins, or clips, or combinations thereof. The carriage provides a convenient mechanical interface for mounting the printing elements to the robot.

In particular, movement of a traveling carriage to which one or more inkjet printing devices are fixed may be provided by a parallel-axis gantry or by a non-Cartesian robot. An example of parallel-axis Cartesian movement in a 3D Printer may be found in any machine manufactured by Z Corporation through 2010, for example, the ZPrinter™ z510 or z310. Other examples of Cartesian movements in robotics are provided by commercial X-Y tables, such as those manufactured by Aerotech Inc. Exemplary suitable commercial X-Y tables from Aerotech include, e.g., an ANT95-XY base & plus mechanical-bearing direct-drive XY linear stage or an ANT130-XY base & plus mechanical-bearing direct-drive XY linear stage. See, for example, http://aerotech.com/product-catalog/stages/linear-x-stages.aspx. An example of a noncartesian robot is an industrial robot arm, such as the IRB-140 or IRB-260 manufactured by ABB, Inc. Patterning of the liquid jetting fluid may be controlled by digital information supplied by a computer.

A 3D printing apparatus may include the fluid dispenser with printhead 100 and carriage 110 disposed over a stage 120. The stage is preferably level, i.e., horizontal with respect to the ground, and includes a flat rigid surface suitable for forming layers of loose powder 130 thereon. The loose powder on the stage is also referred to herein as a substrate or powder bed.

As noted above, during use while printing, the ink-jet printhead may be tilted at a slight angle θ, e.g., 2-20 degrees from the vertical, more preferably 5-15 degrees. The tilted orientation of the printhead is defined by the angle between the direction of firing of the jets with the plane of the substrate, or powder bed. The angle θ may be measured relative to a line perpendicular to the surface of the stage. Thus, if the stage is level with respect to the ground, the angle θ is measured relative to vertical. Accordingly, the carriage that holds the printhead may be oriented rectilinearly with respect to the printhead while being oriented obliquely to the substrate; or the carriage might be oriented obliquely relative to the printhead and oriented rectilinearly with respect to the substrate; or the carriage might be oriented obliquely with respect to both the printhead and the substrate. The difference in these oblique angles providing the tilted orientation is described herein. Because the preferred embodiment of this invention involves a plurality of printheads, and the distance between each printhead and the substrate is preferably held constant and relatively small, it is preferred that the plurality of printheads be mounted at an oblique angle within a carriage, and the carriage be poised rectilinearly with respect to the substrate. The group of tilted printheads may be spread out laterally in a plane parallel to the plane of the substrate.

A spreading mechanism 140 may be used to level the powder disposed on the stage. A suitable spreading mechanism 140 may be a counter-rotating roller, i.e., a doctor blade as described in U.S. Pat. No. 5,204,055, or a rotating cylindrical rod, or a nonrotating solid body such as a rod or linear shoe having a variably curved surface that travels horizontally across the print plane to flatten the upper surface of the bed of powder. Geometrically, any extruded shape might be used to level the bed of powder. The surface that passes through the line of contact between the spreading mechanism and the powder is preferably horizontal, i.e., possesses zero slope. It is preferably specified in terms of its second derivative, or curvature. Thus, one may use a blade with a very large curvature. i.e., having a sharp edge, or a cylinder with a moderate curvature. A flat plane with zero curvature is not suitable because the spreader mechanism must curve away from the powder bed somewhere. One option is a shoe formed by a straight bar with a variably curved surface underneath that approximates a cylinder along the line of contact with the bed. As a practical matter, however, cylindrical rods or tubes are more convenient for presenting a curved surface to the powder bed.

Figure 2:
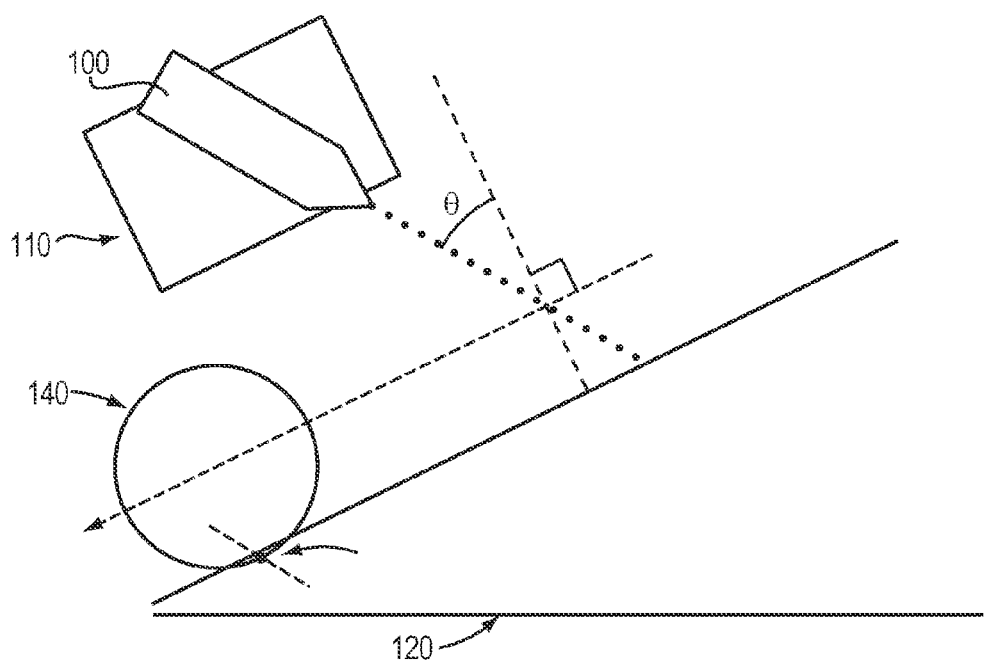
FIG. 2 is a schematic diagram illustrating an inclined printhead dispensing a liquid onto an inclined bed of powder, in accordance with an embodiment of the invention.

Referring also to FIG. 2, in some embodiments, the powder bed may be inclined with respect to the stage 120. With an inclined powder surface, the angle θ is preferably defined with respect to a line perpendicular to a surface of the powder. When the powder bed has a varying thickness and is inclined, the carriage 110 preferably travels in a plane parallel to the surface of the powder, but not parallel to the stage.

Exemplary apparatus for powder dispensing and spreading are machines manufactured by 3D Systems, Inc., and formerly manufactured by Z Corporation of Burlington, Mass. In these machines, powder is supplied from a box with a moveable bottom that pushes powder up from below the print plane in an area off to the side of the print area. Alternatively, powder may be supplied from a dispenser over the print plane, either in a pile off to the side of the print area from a stationary feeder or by means of a traveling dispenser, i.e., a dispensing hopper, that deposits powder in a relatively uniform film across the entire build area.

A method for creating three dimensional articles by combining a fluid dispensed by an inkjet printhead and a loose powder spread by a levelling or spreading mechanism 140 has been described by Sachs et. al. in U.S. Pat. No. 5,204,055. In a typical embodiment, the powdered substrate is first formed by providing a quantity of loose powder in a heap or series of heaps across a printing area, and subsequently a spreading mechanism, i.e., a leveling mechanism such as a cylindrical rod, either rotating or stationary, is drawn in a straight line across the area, flattening the volume of powder into a generally planar surface. After forming a level surface in a print area, an inkjet printhead is traversed over the print area, and a liquid jetting fluid is dispensed in a pattern coinciding with a cross-section of a part that is desired. The first and second steps are repeated until a series of layers is formed that bond together to form a continuous region of saturated powder representing the desired part. In the time following the sequential leveling of powder and dispensing of fluid, soluble or reactive components in the liquid and the powder react to bond together grains of the powder, thereby forming a microscopically bonded network of powder grains. These grains comprise the bulk material forming the structure of the desired part.

Following at least partial completion of the bonding reaction (either dissolution and drying or chemical reaction) the solid article is removed from the print area and cleaned of powder that was not bound to the solid, i.e., it occupied regions that were excluded from the printed sectional patterns and remained dry throughout the process.

The repeated cycle of spreading powder and printing liquid comprises the process known to those versed in the art as Three Dimensional Printing.

Figure 3:
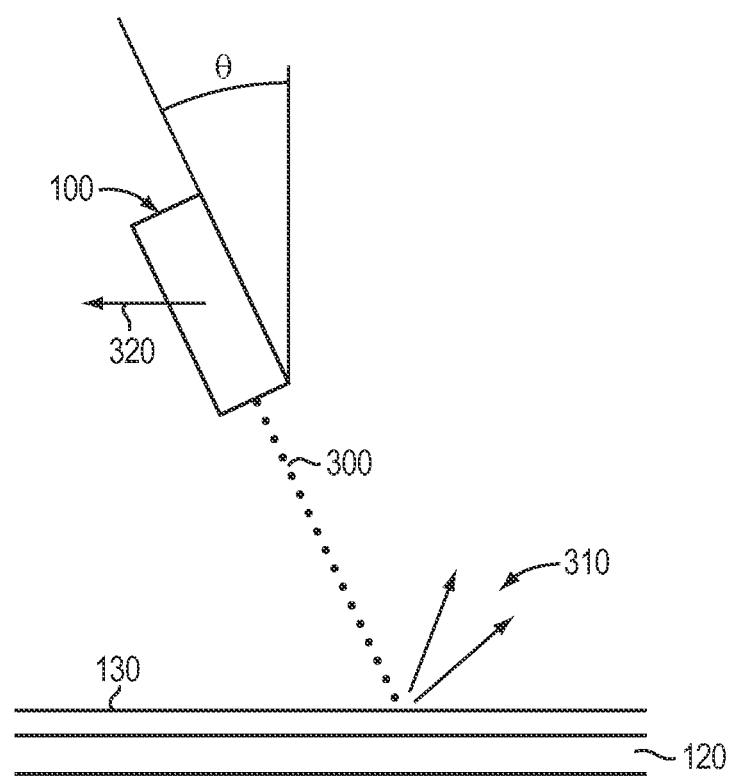
FIG. 3 is a schematic diagram illustrating an inclined printhead dispensing a liquid onto a level bed of powder, in accordance with an embodiment of the invention.

Referring to FIG. 3, when 3D printing in accordance with embodiments of the invention, droplets 300 of liquid are dispensed from the tilted printhead 100 onto a surface of powder, i.e., powder substrate 130 disposed on a stage 120. The liquid may be a liquid binder, i.e., any of a variety of aqueous or non-aqueous jetting fluids optimized for the printing hardware in use, for example, ZB60 binder from Z Corporation (subsequently acquired by 3D Systems Inc.) that can be used in bubble-jet printheads manufactured by Hewlett Packard. The powder substrate may be, e.g., ZP150 powder, manufactured by Z Corporation (subsequently acquired by 3D Systems Inc.) Other examples of suitable liquid binders and powders may be found, for example, in U.S. Pat. No. 5,204,055 to Sachs.

Tilting the printhead with respect to the powder bed 130 has the effect of breaking the symmetry of droplet 300 impact, causing ejected powder 310 to fly in a direction away from the angle of incline θ. The printhead and the substrate are in relative motion 320 during printing, and the angle θ preferably provides an inclination such that powder is ejected in the direction of material that the printhead has already passed over, i.e., towards regions of powder that were visited most recently. This strategy does not reduce the quantity of powder ejected, but ensures that the powder travels away from the printhead as the powder rises up from a bed of powder. This technique greatly reduces the frequency with which foreign material deposits on the printhead during operation of a powdered-substrate 3D printer.

Powder ejected by impact of a fluid jet does not emerge from the substrate in a well-defined beam as light might travel if reflected from a mirror. Instead, powder is ejected in all directions with the material with the highest speed concentrated in a cone oriented away from the direction of the approaching jet. The exact dynamical characteristics of the ejected plume depends on the properties of the powder and the jet: the density and grain size of the powder; the powder's internal friction; and the mass and velocity of the incoming droplets.

It has been found that tilting the printhead from within a range of angles of 2 and 20 degrees, more preferably between 5 and 15 degrees from the vertical provides the best effect, with the preferred angle being approximately 10 degrees. If the angle is less than approximately 5 degrees, the powder may splash back essentially vertically. If the angle is greater than approximately 15 degrees, additional benefit may not be obtained, and one risks the printed pixels being drawn out into oblongs in the powder bed, or bouncing off the substrate entirely. Also, air drag may become an issue when flight distance is increased. Moreover, tilting the printheads more than 15 degrees, preferably more than 10 degrees may be a challenge to achieve without a portion of the printhead hanging down too far and intersecting the substrate. Preferably, the angle is as steep as possible, while allowing the ejected plume of powder to miss the nozzles.

Figure 4A:
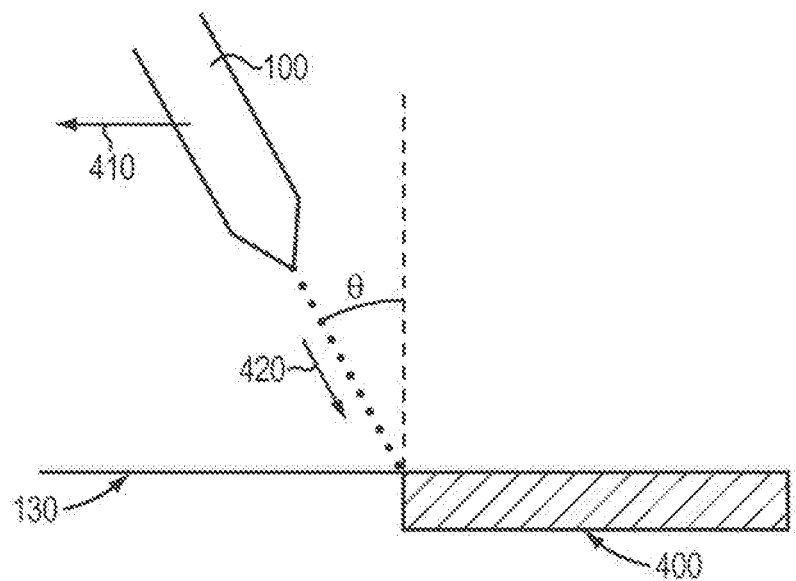
FIGS. 4A and 4B are schematic diagrams illustrating a three-dimensional printing method in accordance with an embodiment of the invention.
Figure 4B:
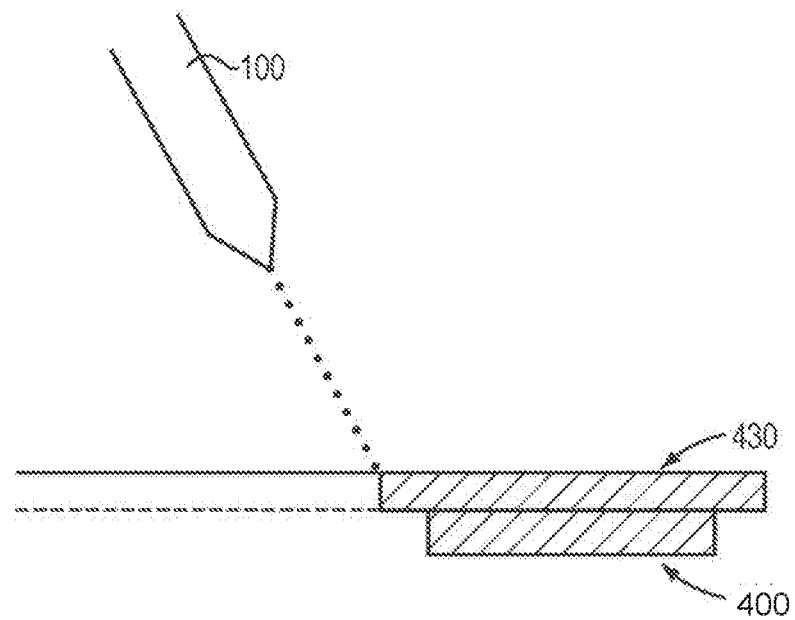

Referring to FIGS. 4A and 4B, a solid article may be fabricated by forming a bed of loose solid powder 130. The bed may be level, i.e., parallel to the ground. A fluid dispenser including a printhead 100 may be moved parallel to the bed. A liquid from the fluid dispenser may be dispensed so as to deposit the liquid onto at least a portion of a surface of the powder to form a first printed layer 400 having a first pattern printed thereon. As discussed above, the printhead may be inclined at an angle of 2 to 20 degrees from vertical with respect to the bed 130, preferably 5 to 15 degrees from vertical with respect to the bed 130. The fluid dispenser, including the printhead 100, may be moved in a first direction 410 over the bed while the liquid is dispensed, with the liquid dispensed by the dispenser traveling at the angle of inclination θ in a second direction 420, away from the first direction.

Subsequently, a second layer of loose solid powder may be formed over the first printed layer 400. A liquid may be dispensed from the dispenser onto the second layer to define a second printed layer 430 having a second pattern different from the first pattern printed on the first printed layer 400. The liquid and powder may be allowed to intermix to form the solid article.

Those skilled in the art will readily appreciate that all parameters listed herein are meant to be exemplary and actual parameters depend upon the specific application for which the methods and materials of the present invention are used. It is, therefore, to be understood that the foregoing embodiments are presented by way of example only and that, within the scope of the appended claims and equivalents thereto, the invention may be practiced otherwise than as specifically described.

What is claimed is:

1. A method for fabricating a solid article by three-dimensional printing, the method comprising the steps of:
   a. forming a bed of loose solid powder;
   b. moving a fluid dispenser parallel to the bed; and
   c. dispensing a liquid from the fluid dispenser onto at least a portion of a surface of the powder to form a first printed layer having a first pattern printed thereon, wherein the fluid dispenser comprises a printhead inclined at an angle selected from a range of 2 to 20 degrees from vertical with respect to the bed.

2. The method of claim 1, wherein the angle is selected from a range of 5 to 15 degrees from vertical with respect to the bed.

3. The method of claim 1, wherein the fluid dispenser is moved in a first direction over the bed while the liquid is dispensed, and the liquid dispensed by the fluid dispenser travels at the angle of inclination in a second direction, away from the first direction.

4. The method of claim 1, wherein the bed of loose solid powder is level.

5. The method of claim 1, further comprising:
   c. spreading a second layer of loose solid powder over the first printed layer.

6. The method of claim 5, further comprising:
   d. dispensing the liquid from the fluid dispenser onto the second layer to define a second pattern different from the first pattern printed on the first printed layer.

7. The method of claim 6, further comprising:
   e. allowing the liquid and powder to intermix to form the solid article.

8. An apparatus for forming solid articles by three-dimensional printing, the apparatus comprising:
   a stage;
   a spreading mechanism configured to spread layers of loose powder on the stage; and
   a fluid dispenser disposed above the stage and configured to dispense droplets of fluid that travel in free flight to the stage, wherein the fluid dispenser comprises a printhead tilted at an angle selected from a range of 2 to 20 degrees relative to a line perpendicular to a surface of the stage.

9. The apparatus of claim 8, wherein the angle is selected from a range of 5 to 15 degrees relative to a line perpendicular to a surface of the stage.

10. The apparatus of claim 8, wherein the spreading mechanism is selected from the group consisting of a blade, a stationary cylindrical rod, a rotating cylindrical rod, and a straight bar comprising a variably curved surface.

11. The apparatus of claim 8, herein the spreading mechanism is disposed above the stage and in a plane parallel thereto.

12. The apparatus of claim 8, wherein the fluid dispenser comprises a traveling carriage configured to move the fluid dispenser laterally over the stage at a fixed height, in a direction such that the angle of tilt projects the droplets towards regions of the stage that were most recently visited.

13. The apparatus of claim 8, wherein the carriage is oriented rectilinearly with respect to the printhead and oriented obliquely with respect to the stage.

14. The apparatus of claim 8, wherein the carriage is oriented obliquely with respect to the printhead and oriented rectilinearly with respect to the stage.

15. The apparatus of claim 8, wherein the carriage is oriented obliquely with respect to the printhead and the stage.

16. The apparatus of claim 8, wherein the printhead is affixed to the carriage by at least one of a clamping mechanism, a fastener, or a combination thereof.

17. The apparatus of claim 16, further comprising a robot, wherein the carriage comprises an electrical and mechanical interface between the robot and the printhead.

* * * * *